Figure 1:
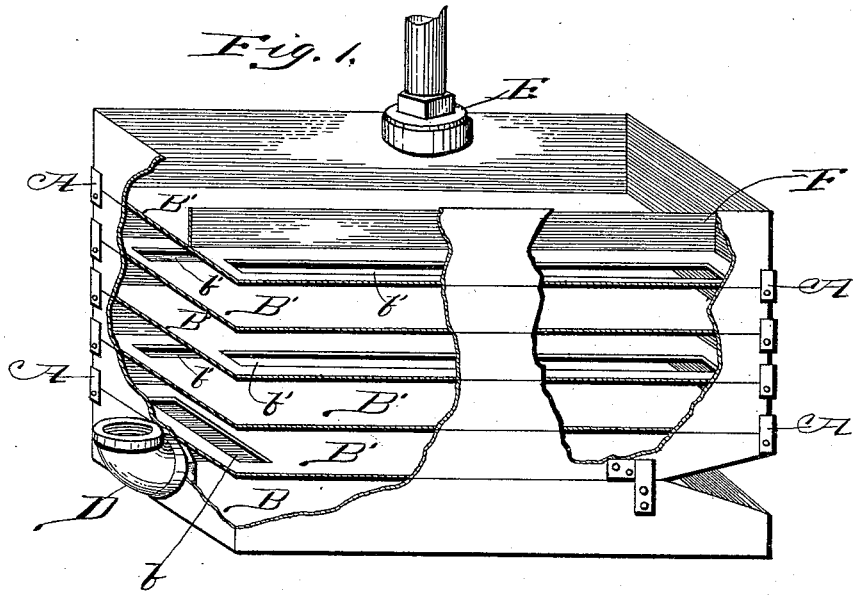

(No Model.)   2 Sheets—Sheet 1.

F. J. HENDERSON.
FEED WATER PURIFIER.

No. 494,143.   Patented Mar. 28, 1893.

Witnesses
W. D. Middleton
Reta M. Wagner

Inventor
Fredrick J. Henderson
By his Attorney
Chas. G. Page (No Model.) 2 Sheets—Sheet 2.

F. J. HENDERSON.
FEED WATER PURIFIER.

No. 494,143. Patented Mar. 28, 1893.

Witnesses
W. L. Middleton
Reta M. Wagner

Inventor
Fredrick J. Henderson
By Chas. G. Page
Atty

UNITED STATES PATENT OFFICE.

FREDRICK J. HENDERSON, OF CHICAGO, ILLINOIS.

FEED-WATER PURIFIER.

SPECIFICATION forming part of Letters Patent No. 494,143, dated March 28, 1893.

Application filed May 24, 1892. Serial No. 434,218. (No model.)

*To all whom it may concern:*

Be it known that I, FREDRICK J. HENDERSON, a citizen of the United States, residing at Chicago, in the county of Cook and State of Illinois, have invented a certain new and useful Improvement in Feed-Water Purifiers, of which the following is a specification.

My present invention consists in certain improvements upon the feed-water purifier embodied in Letters Patent of the United States, No. 468,084, granted to me February 2, 1892.

The objects of my present invention are to provide the pans with mats adapted to collect the scale and of such construction that they can be readily cleaned and used after cleaning; to cause the water to flow slowly and in thin sheets over the mats or bottoms of the pans so as to insure deposition of the scale, and to effectively heat the water preparatory to its passage through the purifier.

To the attainment of the foregoing and other useful ends, I provide flexible, jointed metallic mats which can be laid flat upon the bottoms of the pans in order to collect the scale. These mats can be easily cleansed, and will not become bent or warped, and hence each mat can be used an indefinite number of times, and when thus used it can be laid flat upon the bottom of the pan. I also make the pans of oblong shape and provide all excepting the two lower pans with oblong longitudinally arranged discharge openings formed through the bottoms of the pans and positioned alternately adjacent to opposite sides of the same, in which way the flow of water over the pan bottoms will be slow and in thin sheets. The lowest pan of the series is used as the mud pan, and the next upper pan is provided with a discharge opening arranged transversely to the length of the pan and positioned adjacent to one end thereof so as to discharge into the mud pan at a point near the blow off. The top pan of the series is also provided with a longitudinally arranged partition, less in height than the depth of the pan and positioned to provide at one side of the discharge opening a compartment wherein the feed-water will collect before flowing over said partition on its way to the discharge opening allotted to such pan. In this way the feed water received at the top of the purifier will be subject to hot dry steam within the boiler and hence will be heated before passing down through the apparatus.

Figure 2:
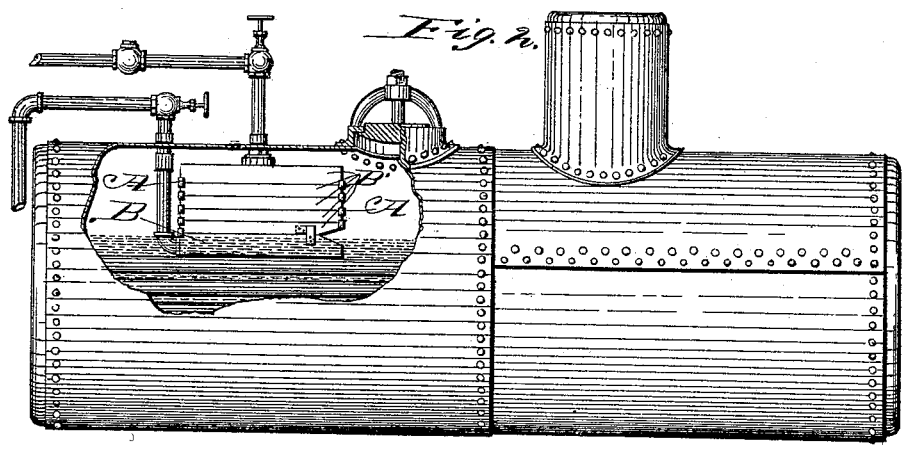
Figure 3:
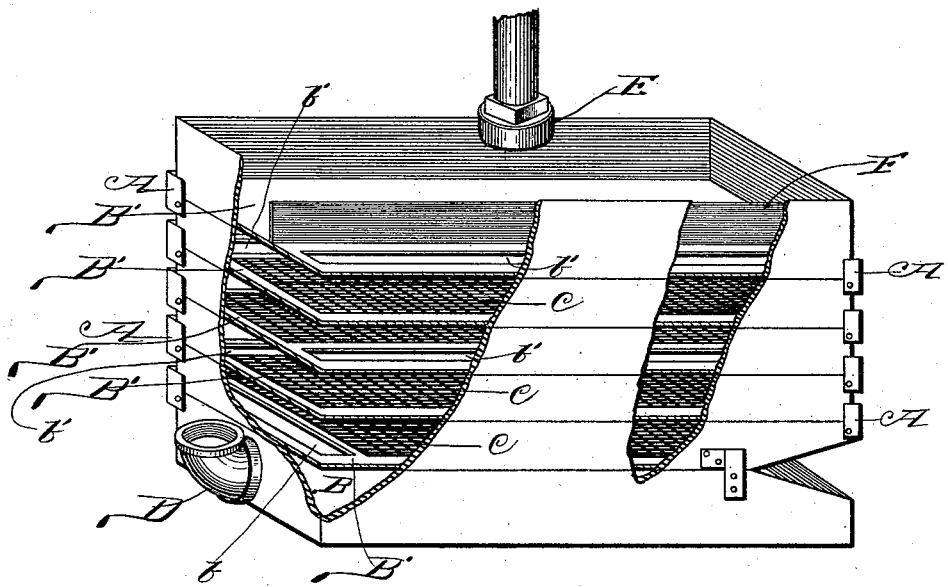
Figure 4:
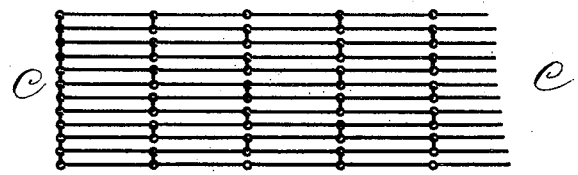
Figure 5:
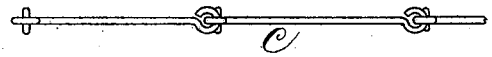

In the accompanying drawings,—Figure 1 represents in perspective a feed water purifier constructed in accordance with my invention, with the mats removed, and portions broken away for convenience of illustration. Fig. 2 shows in side elevation a boiler with a portion broken away so as to expose the feed water purifier suspended therein. Fig. 3 is a view similar to Fig. 1, with the mats in place within the pans. Fig. 4 illustrates one way in which the mat can be formed, the spaces between the links being exaggerated for convenience of illustration. Fig. 5 is an enlarged edge view of a portion of Fig. 4.

The purifier comprises a series of oblong pans or shallow receptacles which are arranged one upon the other and held against lateral displacement by angular corners cleats A secured to alternate pans in the set or series as indicated in Fig. 1. The lowest pan B of the series constitutes the mud pan, while the remaining pans B' are employed for the collection of scale.

Upon the bottom of each pan B' I place a flexible, jointed metallic mat C upon which the scale will be deposited. The mat is formed of stout wire links jointed together in any suitable way, and being flexible will lie flat upon the bottom of the pan, and when removed from the pan, it can be easily cleaned. I am aware that it has been proposed to use a flexible mat of burlaps but in such case the mat must be thrown away, after a short period of service. It has also been proposed to support wire screens in a vertical position for collecting boiler scale, and in United States Letters Patent No. 330,758 for feed water purifier and heater, it is proposed to provide a filter or strainer consisting of a series of superposed layers of fine wire cloth or gauze, but I find the employment of a mat of wire cloth in my apparatus open to the serious objection that in cleaning the same the mat becomes bent and will not again lie flat upon the botton of a pan. As a matter of improvement, I provide a flexible jointed metallic mat which being jointed, will not become warped or bent in cleaning and will lie flat upon the bottom of a pan after it has been cleansed, and since the said mat is made of metal, it will be capable of a long period of service. The bottom of the pan next above the mud pan B is provided with a slot or oblong opening $b$ which is arranged transversely to the length of the oblong pan and adjacent to one end thereof so as to discharge into the mud pan at a point near a blow-off pipe connection D located to discharge from the mud pan. The remaining upper pans are however each provided with a slot or oblong opening $b'$ arranged parallel with the length of the oblong pan and adjacent to one side of the same. These discharge openings $b'$ are arranged successively adjacent to one and the other of the two opposite sides of the set of pans. By arranging the openings $b'$ through the pan bottoms so as to place them successively at alternate sides of the purifier, the water discharged upon the bottom of one pan must flow over the greater portion of the same before reaching the discharge opening, and in this way I am enabled to secure the slow flow of a sheet of water over a considerable area of surface, and by arranging the oblong openings $b'$ lengthwise of the pan, I am enabled to cause the water thus flowing over the pan bottom, to spread out in a thin sheet. The nozzle E of the supply pipe is arranged to spray the feed water into the top pan of the series at a point adjacent to the side thereof which is farthest from the discharge opening allotted to such pan. This top pan contains a vertical partition F arranged lengthwise of the pan and adjacent to its discharge opening $b'$, in which way the feed water will discharge into a portion of the pan which is separated from the discharge opening thereof by the said longitudinally arranged partition F. Said partition is made somewhat less in height than the height of the sides of the pan so that while a certain quantity of water will collect in the pan, it will at a certain point flow over the partition.

The compartment thus formed within the top pan serves as a heater for the water collecting therein, it being seen that although there will be an overflow over the partition F, there will be within the aforesaid compartment a constant body of water which is subject to the hot dry steam within the boiler.

What I claim as my invention is—

1. In a feed water purifier, a flexible jointed metallic mat for collecting boiler scale, substantially as described.

2. In a feed water purifier such as set forth, a series of superposed oblong pans whereof the one next over the lowest pan is provided with a transverse discharge opening $b$ adjacent to one end of the pan, while the remaining upper pans are provided with longitudinally arranged oblong discharge openings $b'$ arranged alternately adjacent to and extending parallel with the opposite longer sides of the pans, substantially as described.

3. In a feed water purifier such as set forth, a set of superposed oblong pans provided with discharge openings arranged as and for the purpose described, and a partition F arranged lengthwise within the top pan which has an oblong discharge opening $b'$ arranged parallel with and near one of its longer sides, with said partition arranged parallel with and near said opening so as to provide at one side of the longitudinal discharge opening $b'$ through the bottom of said pan a receptacle wherein the water received by the purifier is heated, substantially as described.

FREDRICK J. HENDERSON.

Witnesses:
W. D. MIDDLETON,
CHAS. G. PAGE.